United States Patent
Sahu et al.

(10) Patent No.: US 11,475,341 B2
(45) Date of Patent: Oct. 18, 2022

(54) SYSTEMS AND METHODS FOR OBTAINING OPTIMAL MOTHER WAVELETS FOR FACILITATING MACHINE LEARNING TASKS

(71) Applicant: Tata Consultancy Services Limited, Mumbai (IN)

(72) Inventors: Ishan Sahu, Kolkata (IN); Snehasis Banerjee, Kolkata (IN); Tanushyam Chattopadhyay, Kolkata (IN); Arpan Pal, Kolkata (IN); Utpal Garain, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1021 days.

(21) Appl. No.: 16/179,771

(22) Filed: Nov. 2, 2018

(65) Prior Publication Data
US 2019/0205778 A1    Jul. 4, 2019

(30) Foreign Application Priority Data
Dec. 28, 2017    (IN) .............................. 201721047125

(51) Int. Cl.
*G06N 7/00*        (2006.01)
*G06F 17/14*       (2006.01)
(Continued)

(52) U.S. Cl.
CPC ............. *G06N 7/00* (2013.01); *G06F 17/148* (2013.01); *G06F 17/18* (2013.01); *G06K 9/6267* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,219,373 B1 * | 4/2001 | Lee | G01S 19/21 375/144 |
| 6,434,261 B1 | 8/2002 | Zhang et al. | |
| | (Continued) | | |

FOREIGN PATENT DOCUMENTS

CN    104523266    4/2015

OTHER PUBLICATIONS

Gautam, Mayank & Giri, Vinod. (2016). A neural network approach and wavelet analysis for ECG classification. 10.1109/ICETECH. 2016.7569428. (Year: 2016).*

(Continued)

*Primary Examiner* — Roy Y Yi
(74) *Attorney, Agent, or Firm* — Finnegan, Henderson, Farabow, Garrett & Dunner LLP

(57) ABSTRACT

Systems and methods for obtaining optimal mother wavelets for facilitating machine learning tasks. The traditional systems and methods provide for selecting a mother wavelet and signal classification using some traditional techniques and methods but none them provide for selecting an optimal mother wavelet to facilitate machine learning tasks. Embodiments of the present disclosure provide for obtaining an optimal mother wavelet to facilitate machine learning tasks by computing values of energy and entropy based upon labelled datasets and a probable set of mother wavelets, computing values of centroids and standard deviations based upon the values of energy and entropy, computing a set of distance values and normalizing the set of distance values and obtaining the optimal mother wavelet based upon the set of distance values for performing a wavelet transform and further facilitating machine learning tasks by classifying or regressing, a new set of signal classes, corresponding to a new set of signals.

9 Claims, 5 Drawing Sheets

(51) Int. Cl.
*G06N 20/00* (2019.01)
*G06F 17/18* (2006.01)
*G06K 9/62* (2022.01)

(56) References Cited

U.S. PATENT DOCUMENTS 6,542,836 B1 * 4/2003 Sasaki .................... G01R 23/16
375/240.19
6,728,645 B1   4/2004 Kozlov et al.

OTHER PUBLICATIONS

Chuang et al. ("Wavelet descriptor of planar curves: theory and applications," in IEEE Transactions on Image Processing, vol. 5, No. 1, pp. 56-70, Jan. 1996) (Year: 1996).*
Priyadarshini, M.S. et al. (2017). "Selection of Mother Wavelet for Processing of Power Quality Disturbance Signals using Energy for Wavelet Packet Decomposition," *International Journal of Pure and Applied Mathematics*, vol. 114, No. 9; pp. 313-323.
Mitchell, E.J. (Dec. 2014). *A Machine Learning Framework for Automatic Human Activity Classification from Wearable Sensors* (Doctoral dissertation). Retrieved from http://doras.dcu.ie/20336/1/A_MACHINE_LEARNING_FRAMEWORK_FOR_AUTOMATIC_HUMAN_ACTIVITY_CLASSIFICATION_FROM_WEARABLE_SENSORS_-_EDMOND_MITCHELL_-PHD_THESIS.pdf (182 pages).

* cited by examiner

SYSTEMS AND METHODS FOR OBTAINING OPTIMAL MOTHER WAVELETS FOR FACILITATING MACHINE LEARNING TASKS

PRIORITY CLAIM

This U.S. patent application claims priority under 35 U.S.C. § 119 to: India Application No. 201721047125, filed on Dec. 28, 2017. The entire contents of the aforementioned application are incorporated herein by reference.

TECHNICAL FIELD

The present disclosure generally relates to obtaining optimal mother wavelets for facilitating machine learning tasks. More particularly, the present disclosure relates to systems and methods for obtaining optimal mother wavelets for facilitating machine learning tasks.

BACKGROUND

Generally, wavelets are mathematical functions that essentially split data into a plurality of frequency components in order to study each component with a resolution matched to its scale. A wavelet analysis procedure is performed to adopt a wavelet prototype function called or referred to as an analyzing wavelet or a mother wavelet. Ideally, wavelets are used for analyzing signals with a high resolution by both time and frequency domain using multiple time shifts and frequency scales. Whenever a wavelet matches with the morphology of the signal that has been identified, application of wavelet transforms like discrete wavelet transform assists in the analysis and feature extraction from the signal.

A mother wavelet forms basis for the analysis of a given signal in the wavelet transform. The mother wavelet may differ from one application to the other, based on a specific task being executed on signal classes. The selection is of an optimum mother wavelet is thus important, as the results obtained by applying the wavelet transform may get affected by the mother wavelet selected. Hence, there has to be a degree of correlation between a signal and the mother wavelet. Further, one may select from a large number of mother wavelet functions. Therefore, the biggest challenge of applying wavelet analysis is how to choose a desired mother wavelet for a given task. It is generally agreed that the success of the application of the wavelet transform hinges on the selection of a proper wavelet function for a task.

The traditional systems and methods provide for selection of the mother wavelet using well-known techniques, for example, Continuous Wavelet Transform (CWT), but none of them provide for the selection of an optimal or best mother wavelet which may be implemented for a machine learning task.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

Systems and methods of the present disclosure enable obtaining optimal mother wavelets for facilitating machine learning tasks. In an embodiment of the present disclosure, there is provided a method for obtaining optimal mother wavelets for facilitating machine learning tasks, the method comprising: identifying, by one or more hardware processors, a first set of signal data, based upon a plurality of signals, wherein the first set of signal data comprises labelled datasets corresponding to one or more signal classes; computing, based upon the first set of signal data and a probable set of mother wavelets, values of energy and entropy comprising of an entropy ratio and multilevel wavelet entropy of a first set of signals corresponding to a wavelet transform by the probable set of mother wavelets; computing, based upon the values of energy and entropy, a second set of signal data comprising values of centroids and standard deviations of the first set of signals corresponding to the one or more signal classes; computing, based upon the second set of signal data, a set of distance values comprising distance between the centroids corresponding to the one or more signal classes, wherein the set of distance values are computed based upon a function corresponding to the second set of signal data; obtaining, one or more optimal mother wavelets, for performing the wavelet transform of the first set of signals, based upon the set of distance values and the values of standard deviations corresponding to the one or more signal classes; computing the set of distance values by normalizing, the set of distance values, using a N-norm technique, based upon the values of energy and entropy, to obtain the one or more optimal mother wavelets; obtaining the one or more optimal mother wavelets by analyzing, the probable set of mother wavelets, based upon the labelled datasets, to classify the one or more signal classes; and enabling, by the obtained one or more optimal mother wavelets, decomposition of a second set of signals, by performing a wavelet transform of the second set of signals, and wherein the second set of signals facilitate machine learning tasks by classifying or regressing, one or more signal classes corresponding to the second set of signals.

In an embodiment of the present disclosure, there is provided a system for obtaining optimal mother wavelets for facilitating machine learning tasks, the system comprising one or more processors; one or more data storage devices operatively coupled to the one or more processors and configured to store instructions configured for execution by the one or more processors to: identify, by one or more hardware processors, a first set of signal data, based upon a plurality of signals, wherein the first set of signal data comprises labelled datasets corresponding to one or more signal classes; compute, based upon a probable set of mother wavelets and the first set of signal data, values of energy and entropy comprising of an entropy ratio and multilevel wavelet entropy of a first set of signals corresponding to a wavelet transform by the probable set of mother wavelets; compute, based upon the values of energy and entropy, a second set of signal data comprising values of centroids and standard deviations of the first set of signals corresponding to the one or more signal classes; compute, based upon the second set of signal data, a set of distance values comprising distance between the centroids corresponding to the one or more signal classes, wherein the set of distance values are computed based upon a function corresponding to the second set of signal data; obtain, one or more optimal mother wavelets, for performing the wavelet transform of the first set of signals, based upon the set of distance values and the values of standard deviations corresponding to the one or more signal classes; normalize, the set of distance values, using a N-norm technique, based upon the values of energy and entropy, to obtain the one or more optimal mother wavelets; analyze, the probable set of mother wavelets, based upon the labelled datasets, to classify the one or more signal classes; and enable, the obtained one or more optimal mother wavelets, decomposition of a second set of signals, by performing a wavelet transform of the second set of signals, and wherein the second set of signals facilitate machine learning tasks by classifying or regressing, one or more signal classes corresponding to the second set of signals.

In an embodiment of the present disclosure, there is provided one or more non-transitory machine readable information storage mediums comprising one or more instructions which when executed by one or more hardware processors causes the one or more hardware processor to perform a method for obtaining optimal mother wavelets for facilitating machine learning tasks, the method comprising: identifying, by the one or more hardware processors, a first set of signal data, based upon a plurality of signals, wherein the first set of signal data comprises labelled datasets corresponding to one or more signal classes; computing, based upon the first set of signal data and a probable set of mother wavelets, values of energy and entropy comprising of an entropy ratio and multilevel wavelet entropy of a first set of signals corresponding to a wavelet transform by the probable set of mother wavelets; computing, based upon the values of energy and entropy, a second set of signal data comprising values of centroids and standard deviations of the first set of signals corresponding to the one or more signal classes; computing, based upon the second set of signal data, a set of distance values comprising distance between the centroids corresponding to the one or more signal classes, wherein the set of distance values are computed based upon a function corresponding to the second set of signal data; obtaining, one or more optimal mother wavelets, for performing the wavelet transform of the first set of signals, based upon the set of distance values and the values of standard deviations corresponding to the one or more signal classes; computing the set of distance values by normalizing, the set of distance values, using a N-norm technique, based upon the values of energy and entropy, to obtain the one or more optimal mother wavelets; obtaining the one or more optimal mother wavelets by analyzing, the probable set of mother wavelets, based upon the labelled datasets, to classify the one or more signal classes; and enabling, by the obtained one or more optimal mother wavelets, decomposition of a second set of signals, by performing a wavelet transform of the second set of signals, and wherein the second set of signals facilitate machine learning tasks by classifying or regressing, one or more signal classes corresponding to the second set of signals.

It is to be understood that both the foregoing general description and the following detailed description are exemplary and explanatory only and are not restrictive of the disclosure, as claimed.

BRIEF DESCRIPTION OF THE DRAWINGS

The embodiments herein will be better understood from the following detailed description with reference to the drawings, in which.

DETAILED DESCRIPTION OF THE EMBODIMENTS

Figure 1:
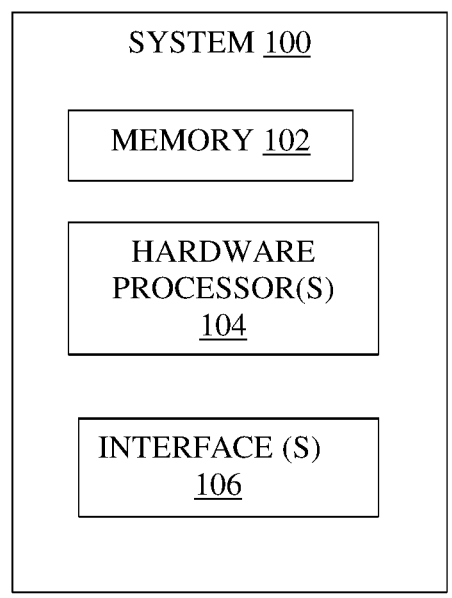
FIG. 1 illustrates a block diagram of a system for obtaining optimal mother wavelets for facilitating machine learning tasks according to an embodiment of the present disclosure.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments of the present disclosure provides systems and methods for obtaining optimal mother wavelets for facilitating machine learning tasks. Wavelet analysis, being a popular time-frequency analysis method has been applied in various fields to analyze a wide range of signals covering biological signals, vibration signals, acoustic and ultrasonic signals, to name a few. With the capability to provide both time and frequency domains information, wavelet analysis is mainly for time-frequency analysis of signals, signal compression, signal de-noising, singularity analysis and features extraction. The main challenge in performing wavelet transform is to select the most optimum mother wavelet for the given tasks, as different mother wavelet applied on to the same signal may produce different results.

Machine learning techniques operate by automatically adjusting parameters of an algorithm so that, after training, the input is correctly classified. Unfortunately, training may involve presenting hundreds of thousands of pairs (input, target) to algorithms and other complicated tasks. The traditional systems and methods provide for signal classification by using some historical signal data to generate a set of features, train a classifier based upon the set of features generated, extracting the classifier model and finally generating a class label predictions based upon the classifier model.

Hence, there is a need for technology that facilitates recommending a mother wavelet based upon which a decomposition of a set of signals may be performed using any of wavelet analysis techniques, the distinction or separation among different class of signals becomes apparent. Further, the technology must facilitate implementing machine learning tasks, wherein a mapping between a signal and a class label may be learnt automatically, so that predictions may be made during testing or real world deployment on signals where such labels are believed to be unknown. In short, the technology must provide for a clear distinction between the signal classes and further facilitating machine learning tasks.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates an exemplary block diagram of a system 100 for obtaining optimal mother wavelets for facilitating machine learning tasks according to an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
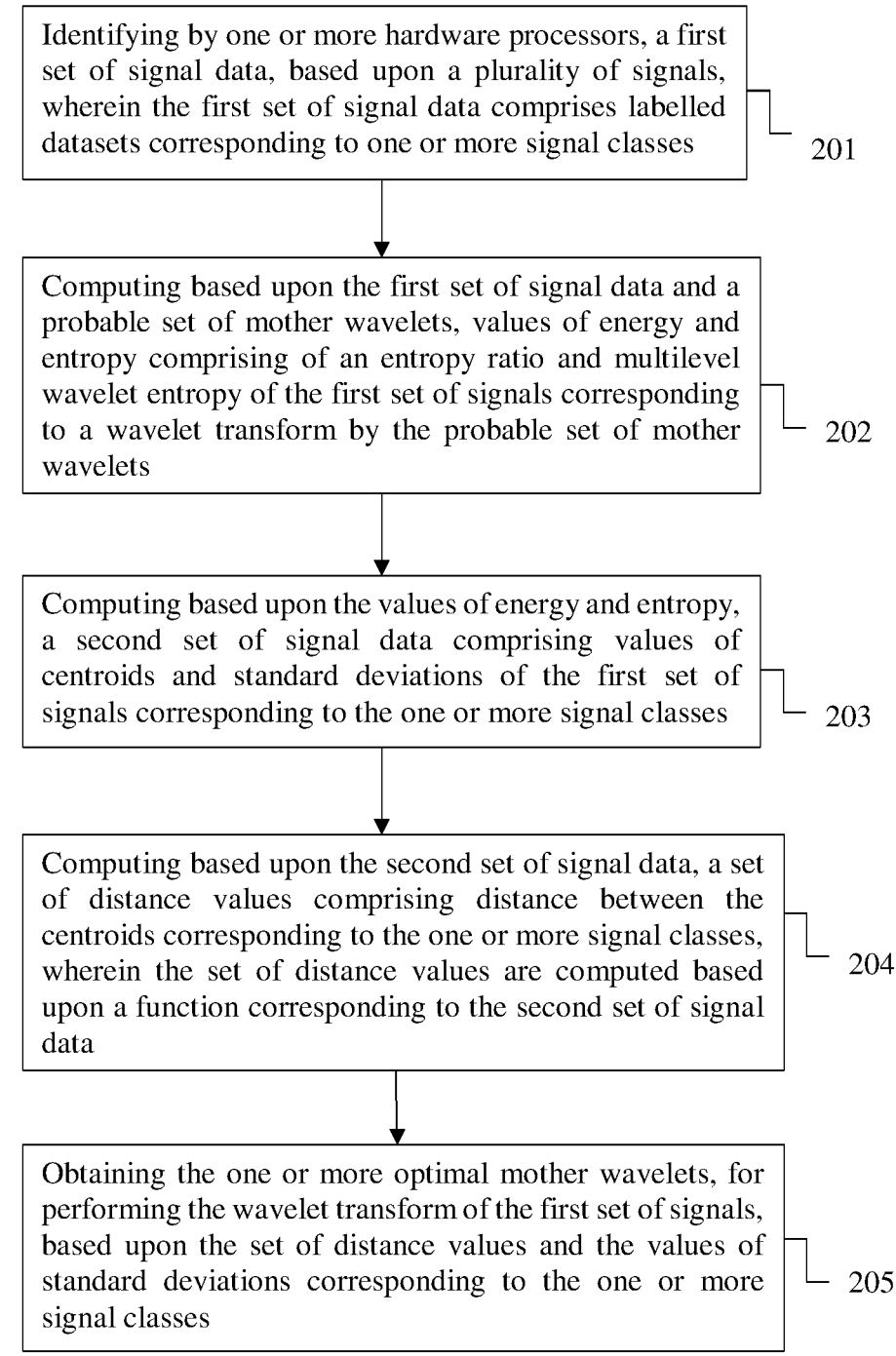
FIG. 2 is a flowchart illustrating the steps involved for obtaining the optimal mother wavelets for facilitating machine learning tasks according to an embodiment of the present disclosure.

FIG. 2, with reference to FIG. 1, illustrates an exemplary flow diagram of a method for obtaining the optimal mother wavelets for facilitating machine learning tasks according to an embodiment of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein.

Figure 3:
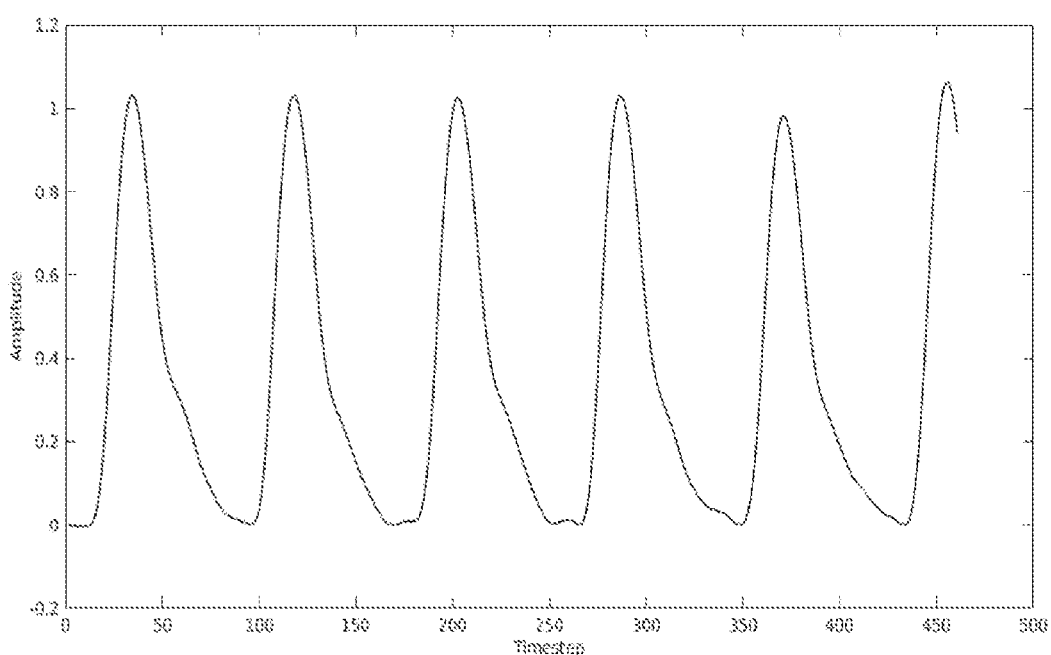
FIG. 3 shows the graphical representation of a plurality of signals corresponding to one class from amongst one or more signal classes for obtaining the optimal mother wavelets according to an embodiment of the present disclosure.
Figure 4:
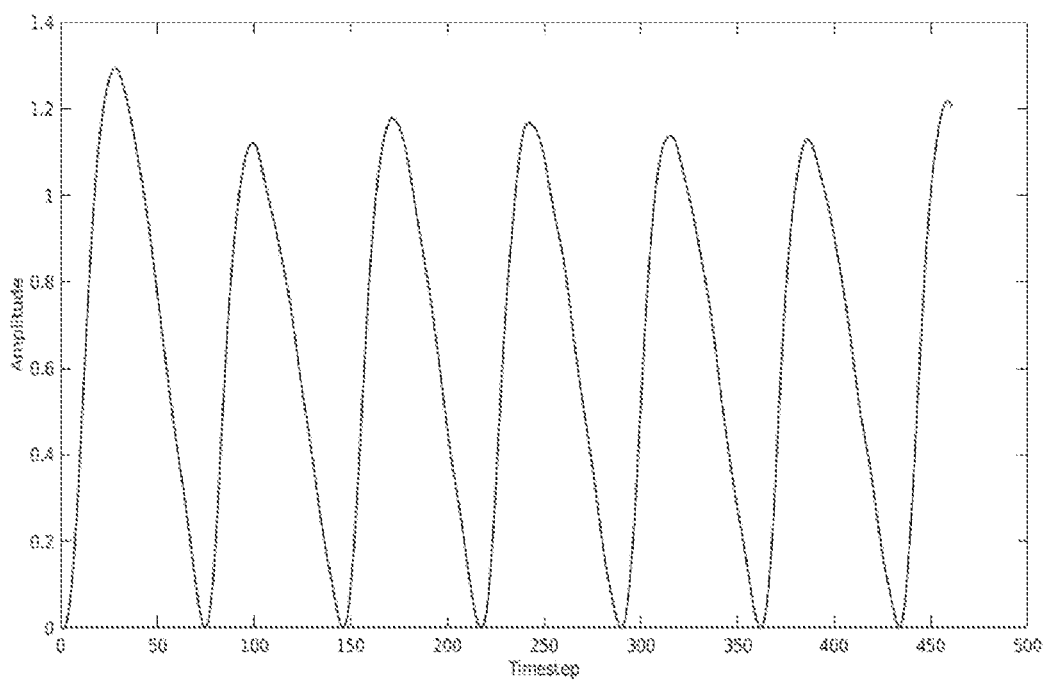
FIG. 4 shows the graphical representation of a plurality of signals corresponding to another class from amongst the one or more signal classes for obtaining the optimal mother wavelets according to an embodiment of the present disclosure.

According to an embodiments of the present disclosure, at step 201, the one or more hardware processors 104 identify, a first set of signal data, based upon a plurality of signals, wherein the first set of signal data comprises labelled datasets corresponding to one or more signal classes. In an embodiment, the plurality of signals may be acquired using one or more sensors (not shown in the figure). In an embodiment, obtaining the labelled datasets comprises acquiring an unlabeled data as an input and augmenting each piece of that unlabeled data with some sort of meaningful "tag," "label," or "class" that is somehow informative or desirable to know. Referring to FIGS. 3 and 4, the plurality of signals (in a waveform), acquired through the one or more sensors may be considered, wherein FIG. 3 shows the plurality of signals corresponding to one class, for example, class 1 from amongst the one or more signal classes and FIG. 4 shows the plurality of signals corresponding to another class, for example, class 2 from amongst the one or more signal classes. Referring to Table 1 below, the first set of signal data comprising of the labelled datasets, based upon the plurality of signals may be referred, wherein each row corresponds to a signal from amongst the plurality of signals acquired through the one or more sensors, and wherein the first column, that is column A, shows the one or more signal classes and columns B, C, D and E show a set of amplitude values at each time step of recording.

TABLE 1

| Signal Class/ Label (A) | Signal Amplitude value (B) | Signal Amplitude value (C) | Signal Amplitude value (D) | Signal Amplitude value (E) |
| --- | --- | --- | --- | --- |
| 1 | 0 | −0.00085 | −0.000153 | −0.00212 |
| 1 | 0 | −0.00096 | −0.00089 | −0.00028 |
| 1 | 0 | 0.004518 | 0.013311 | 0.025202 |
| 1 | 0 | 0.000661 | 0.002034 | 0.003762 |
| 1 | 0 | −0.00044 | −0.00021 | 0.000653 |

According to an embodiments of the present disclosure, at step 202, based upon the first set of signal data and a probable set of mother wavelets, values of energy and entropy may be computed, wherein the values of energy and entropy comprise of an entropy ratio and multilevel wavelet entropy of a first set of signals to corresponding to a wavelet transform by the probable set of mother wavelets. In an embodiment, identification of the probable set of mother wavelets may be performed through any traditional techniques or methods. For example, the one or more hardware processors 104 may extract a list or a table of wavelet keywords by crawling the web and publications to fetch the probable set of mother wavelets. Further, the identification may also be performed through Deep Neural Network technique (not discussed herein), wherein an input signal is passed through various levels of network to obtain the probable set of mother wavelets.

TABLE 2

| Mother Wavelets (subset) |
| --- |
| haar |
| db1 |
| db2 |
| db3 |
| sym2 |
| sym3 |
| coif1 |
| coif2 |
| coif3 |

In the embodiment, the probable set of mother wavelets identified may then be used to decompose the first set of signals by applying a wavelet transform on the first set of signal data. Whenever any mother wavelet (from amongst the probable set of mother wavelets) that matches with the morphology of the first set of signals is identified, application of the wavelet transform facilitates in the analysis and feature extraction from a signal (from amongst the first set of signals). Thereby, the whole process of wavelet transformation is intended to obtain one or more coefficients (comprising of a first level coefficients and detailed coefficients) of a signal (corresponding to the first set of signals), feature extraction and ultimately the usage of those features for facilitating machine learning tasks or any other use case can be automated. In an embodiment, the wavelet transform may be described by basic functions or the probable set of mother wavelets which allows the changing of the values of a previous function in order to get a new function.

In an example implementation, the one or more coefficients may be obtained as below by performing the wavelet transform:

approximate coefficients=−0.000598948, −0.002581435, −0.003833862; and detailed coefficients=0.000598948, 0.000419951, 0.000169352

In an embodiment, a single mother wavelet (from amongst the probable set of mother wavelets) forms the basis to represent an infinite number of child wavelets. The terms that are different include wavelet family, mother wavelet, and child wavelets. The popular methods of performing the wavelet transform include continuous wavelet transform (CWT), Discrete wavelet transform (DWT), Fast wavelet transform (FWT), Lifting scheme and Generalized lifting scheme, Wavelet packet decomposition (WPD), Stationary wavelet transform (SWT), Fractional Fourier transform (FRFT) and Fractional wavelet transform (FRWT).

According to an embodiment of the present disclosure, based upon the one or more coefficients, the values of energy and entropy may be obtained using, for example, Shannon's entropy technique. The values of energy and entropy of a signal corresponding to the one or more signal classes→measure value, for example, a ratio of energy/entropy. Let the ratio be represented by $x_i$ for a signal i. Accordingly, there is one measure value of each signal (from amongst the plurality of signals) in the first set of signal data. Further, the energy of n number of wavelet coefficients obtained using the wavelet transform of a signal (from amongst the plurality of signals) with the probable set of mother wavelet may be represented as -equation (1) below:

$$\text{Energy} = \sum_{i=1}^{n} |C_i|^2 \quad \text{-equation (1)}$$

The Shannon's Entropy for the one or more coefficients may be defined as equation (2) below:

$$\text{Entropy(Shannon)} = -\sum_{i=1}^{n} p_i \log p_i, \quad \text{-equation (2)}$$

where $p_i$ is the distribution of energy probability for each wavelet coefficient $C_i$.

Thus, the ratio of Energy to Shannon's Entropy for a signal (from amongst the plurality of signals) with the probable set of mother wavelets (denoted by $x_i$) may be defined as:

$$p_i = \frac{|C_i|^2}{Eenergy}; \quad \text{equation (3)}$$

and $$\sum_{i=1}^{n} p_i = 1 \quad \text{equation (4)}$$

In an example implementation, based upon the one or more coefficients and equations (3) and (4) corresponding the ratio of Energy to Shannon's Entropy, the values of energy and entropy comprising of an entropy ratio and multilevel wavelet entropy of the first set of signals may be obtained as:

value of energy=112.4818103, value of entropy=−24.029115; and entropy ratio=−4.68106338

It may be noted that the embodiments of the present disclosure do not restrict computation of the values of energy and entropy using the ratio of Energy to Shannon's Entropy only. In an embodiment, similar other computation may be performed for obtaining the values of energy and entropy, for example, Multi-level Wavelet Time-energy Shannon Entropy (MWTEE) to obtain $x_i$.

According to an embodiments of the present disclosure, at step 203, based upon the values of energy and entropy, a second set of signal data comprising values of centroids and standard deviations of the first set of signals, corresponding to the one or more signal classes may be computed. In an embodiment, all the $x_i$ belonging to each of the signals (from amongst the plurality of signals) corresponding to the one or more signal classes may be used computing the values of centroids and standard deviations.

In an embodiment, the values of centroid may be obtained as:

$$\frac{x_1 + x_2 + x_3 + \ldots + x_m}{m}$$

wherein the centroid of a finite set of points $x_1 + x_2 + x_3 \ldots + x_m$ in vector space $R^n$ is:

$$\frac{x_1 + x_2 + x_3 + \ldots + x_m}{m}$$

In an embodiment, the standard deviation of a finite set of points may be computed as:

$$\sqrt{\frac{1}{m-1} \sum_{i=1}^{m} |x_i - u|^2}$$

where $$u = \frac{1}{m} \sum_{i=1}^{m} x_i$$

In an example implementation, using the above equations, the second set of signal data corresponding to the one or more signal classes may be obtained as shown in Table 3 below:

TABLE 3

|  | Class 1 | Class 2 |
|---|---|---|
| Values of Centroid | −0.424363441708168 | −1.44449956902769 |
| Values of Standard Deviation | 1.58208913535412 | 6.15306158570416 |

According to an embodiments of the present disclosure, at step 204, based upon the second set of signal data, a set of distance values comprising distance between the centroids corresponding to the one or more signal classes, wherein the set of distance values are computed based upon a function corresponding to the second set of signal data. In an embodiment, the set of distance values may be computed based upon the values of centroids and standard deviation, using any known techniques and methods, for example, Euclidean distance technique. In the Euclidean distance technique, a Euclidean distance or a Euclidean metric comprises an ordinary straight-line distance between two points in Euclidean space. With this distance, Euclidean space becomes a metric space. As as known in the art, a metric comprises a non-negative function d on a set, that is, d:X×X→(0,inf). For any x, y, z belonging to X, the following conditions are satisfied:

$$d(x,y) \geq 0,$$

$$d(x,y)=0 <=> x=y,$$

$$d(x,y)=d(y,x); \text{ and}$$

$$d(x,z) <= d(x,y)+d(y,z)$$

In an example implementation, using the Euclidean distance technique, the set of distance values comprising distance between the centroids (for each of the probable set of mother wavelets may be obtained as shown in Table 4 below:

TABLE 4

| Mother wavelet (from amongst the probable set of mother wavelets) | Set of distance values (Distance between class centroids) | Values of standard deviation (obtained in step 203) |
|---|---|---|
| 'haar' | 3.76512526587480 | 6.10854511943682 |
| 'db1' | 3.76512526587480 | 6.10854511943682 |
| 'db2' | 3.61111095288220 | 5.85774598167589 |
| 'db3' | 3.60946805009476 | 5.85119614254151 |

According to an embodiment of the present disclosure, the set of distance values may be normalized using a N-norm technique or a max distance value technique. As known in the art, a norm may be function that assigns a strictly positive length or size to each vector in a vector space, except for the zero vector. For example, on an n-dimension Euclidean space $R^n$, the intuitive notion of the length of the vector $x=(x_1, x_2, \ldots, x_n)$ may be captured as:

$$\|X\|_2 := \sqrt{x_1^2 + \ldots + x_n^2}$$

In an example implementation, the set of distance values may be obtained as shown in Table 5 below after performing the normalization:

TABLE 5

| Mother Wavelet (from amongst the probable set of mother wavelets) | Normalized distance values |
|---|---|
| 'haar' | 0.807646751 |
| 'db1' | 0.807646751 |
| 'db2' | 0.77460956 |
| 'db3' | 0.774257146 |

It may be noted that the embodiments of the present disclosure do not restrict computation of the set of distance values using the Euclidean distance technique only. The embodiments provide for computing the set of distance values using any other techniques (for example, a Performance Metric technique or n-ball Octahedron technique) or their combinations thereof. The selection of an appropriate distance function may be based upon the type of the labelled datasets and the corresponding properties of the labelled datasets. Further, the embodiments of the present disclosure support performing normalization of set of distance values using any other techniques or their combinations thereof.

According to an embodiments of the present disclosure, at step 205, the one or more optimal mother wavelets may be obtained for performing the wavelet transform of the first set of signals, based upon the set of distance values and the values of standard deviations corresponding to the one or more signal classes. Thus, the one or more mother wavelets corresponding to a maximum distance value (from the set of distance values computed in step 204 above) are selected. Therefore, in an embodiment, if multiple mother wavelets correspond to the maximum distance value, the mother wavelet with minimum value of standard deviation may be selected.

Figure 5:
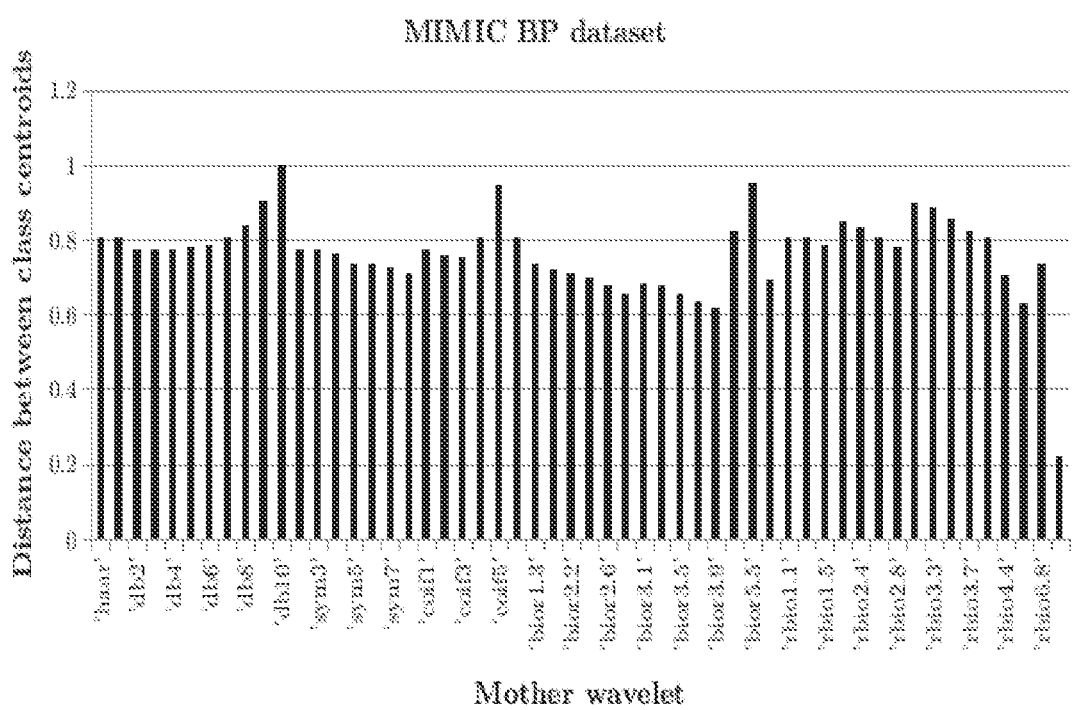
FIG. 5 shows the graphical representation of a set of sample results of a set of distance values normalized corresponding to each mother wavelet analyzed according to an embodiment of the present disclosure.

Referring to FIG. 5 the sample results on MIMIC BP dataset (a freely accessible critical care database by Johnson A E W, Pollard T J, Shen L, Lehman L, Feng M, Ghassemi M, Moody B, Szolovits P, Celi L A, and Mark R G. Scientific Data (2016)) which has two signal classes may be considered. Corresponding to each of the mother wavelet analyzed above, the computed normalized distance between the centroids plotted may be referred. Referring to FIG. 5 again, it may be noted that 'db10' mother wavelet (from amongst the probable set of mother wavelet) gives the maximum distinction between the classes (based upon the example computations shown in the steps 202 to 204 above) and hence may be selected as the optimal mother wavelet.

According to an embodiments of the present disclosure, the obtained one or more optimal mother wavelets enable decomposition of a second set of signals, by performing a discrete wavelet transform of the second set of signals, and wherein the second set of signals facilitate a machine learning implementation by classifying or regressing, one or more signal classes, corresponding to the second set of signals. For example, referring to step 205 above, if 'db10' is obtained as the optimal mother wavelet, 'db10' may be implemented in machine learning tasks like classification of similarly labeled signals of the same type from amongst the second set of signals (that is a new set of signals). The traditional systems and methods provide for the signal classification by using some historical signal data to generate a set of features, train a classifier on the training part of the historical signal data based upon the set of features generated, extracting the classifier model and finally generating a class label predictions based upon the classifier model.

The embodiments of the present disclosure facilitate in generating the set of features from the historical signal data. While generating the set of features based on the wavelet transform, the mother wavelet must be optimal. The selection of the optimal mother wavelet facilitate a higher quality of the generated features. The optimal mother wavelet selected provides for a set of features that facilitates a distinction among the different classes of signals. This facilitates learning and results in a good classifier or a regression model and predictions on the second set of signals. In an embodiment, some of the features that may be computed after performing the wavelet transform based upon the one or more optimal mother wavelets obtained comprise of skewness, kurtosis, energy, zero crossing rate, mean, variance, etc. The computation of all these features based on the wavelet transform are dependent on the one or more optimal mother wavelets.

In an embodiment, the memory 102 can be configured to store any data that is associated with obtaining the optimal mother wavelets for facilitating machine learning tasks. In an embodiment, the information pertaining to the first set of signal data, the probable set of mother wavelets, the values of centroids and standard deviations, the second set of signal data and the set of distance values etc. are stored in the memory 102. Further, all information (inputs, outputs and so on) pertaining to obtaining the optimal mother wavelets for facilitating machine learning tasks may also be stored in the database, as history data, for reference purpose.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, BLU-RAYs, flash drives, disks, and any other known physical storage media.

It is intended that the disclosure and examples be considered as exemplary only, with a true scope and spirit of disclosed embodiments being indicated by the following claims.

What is claimed is:

1. A method for obtaining optimal mother wavelets for facilitating machine learning tasks, the method comprising a processor implemented steps of:
   identifying, by one or more hardware processors, a first set of signal data, based upon a plurality of signals, wherein the first set of signal data comprises labelled datasets corresponding to one or more signal classes;
   computing, based upon the first set of signal data and a probable set of mother wavelets, values of energy and entropy comprising of an entropy ratio and multilevel wavelet entropy of a first set of signals corresponding to a wavelet transform by the probable set of mother wavelets and extracting a list or a table of wavelet keywords by crawling a web and publications to fetch the probable set of mother wavelets and further identifies the mother wavelets through deep neural network technique in which an input signal is passed through levels of network to obtain the probable set of mother wavelets;

computing, based upon the values of energy and entropy, a second set of signal data comprising values of centroids and standard deviations of the first set of signals corresponding to the one or more signal classes;

computing, based upon the second set of signal data, a set of distance values comprising distance between the centroids corresponding to the one or more signal classes, wherein the set of distance values are computed based upon a function corresponding to the second set of signal data;

obtaining, one or more optimal mother wavelets, for performing the wavelet transform of the first set of signals, based upon the set of distance values and the values of standard deviations corresponding to the one or more signal classes, wherein one or more mother wavelets that correspond to a maximum distance value is selected as the optimal mother wavelet, wherein if multiple mother wavelets correspond to the maximum distance value, then the mother wavelet with a minimum value of the standard deviation is selected as the optimal mother wavelet, wherein the obtained one or more optimal mother wavelets enables decomposition of the second set of signals by applying a discrete wavelet transform on the second set of signals and whenever any mother wavelet from the probable set of mother wavelets matches with morphology of the first set of signals is identified, then application of the discrete wavelet transform facilitates in analysis and feature extraction from a signal among the first set of signals, thereby process of the wavelet transform is intended to obtain coefficients of the signal, feature extraction and usage of features extracted for facilitating automated machine learning tasks; and generating a set of features based on selected optimal mother wavelet that facilitates a distinction among varied classes of signals, facilitates learning and results in a classifier or a regression model, predictions on the second set of signals, wherein the selection of the optimal mother wavelet facilitates a higher quality of the generated set of features.

2. The method of claim 1, wherein computing the set of distance values comprises normalizing, the set of distance values, using a N-norm technique, based upon the values of energy and entropy, to obtain the one or more optimal mother wavelets.

3. The method of claim 1, wherein obtaining the one or more optimal mother wavelets comprises analyzing, the probable set of mother wavelets, based upon the labelled datasets, to classify the one or more signal classes.

4. A system for obtaining optimal mother wavelets for facilitating machine learning tasks, the said system comprising:
a memory storing instructions;
one or more communication interfaces; and
one or more hardware processors coupled to the memory via the one or more communication interfaces, wherein the one or more hardware processors are configured by the instructions to:
identify, by the one or more hardware processors, a first set of signal data, based upon a plurality of signals, wherein the first set of signal data comprises labelled datasets corresponding to one or more signal classes;
compute, based upon a probable set of mother wavelets and the first set of signal data, values of energy and entropy comprising of an entropy ratio and multilevel wavelet entropy of a first set of signals corresponding to a wavelet transform by the probable set of mother wavelets and extracting a list or a table of wavelet keywords by crawling a web and publications to fetch the probable set of mother wavelets and further identifies the mother wavelets through deep neural network technique in which an input signal is passed through levels of network to obtain the probable set of mother wavelets;

compute, based upon the values of energy and entropy, a second set of signal data comprising values of centroids and standard deviations of the first set of signals corresponding to the one or more signal classes;

compute, based upon the second set of signal data, a set of distance values comprising distance between the centroids corresponding to the one or more signal classes, wherein the set of distance values are computed based upon a function corresponding to the second set of signal data;

obtain, one or more optimal mother wavelets, for performing the wavelet transform of the first set of signals, based upon the set of distance values and the values of standard deviations corresponding to the one or more signal classes, wherein one or more mother wavelets that correspond to a maximum distance value is selected as the optimal mother wavelet, wherein if multiple mother wavelets correspond to the maximum distance value, then the mother wavelet with a minimum value of the standard deviation is selected as the optimal mother wavelet, wherein the obtained one or more optimal mother wavelets enables decomposition of the second set of signals by applying a discrete wavelet transform on the second set of signals and whenever any mother wavelet from the probable set of mother wavelets matches with morphology of the first set of signals is identified, then application of the discrete wavelet transform facilitates in analysis and feature extraction from a signal among the first set of signals, thereby process of the wavelet transform is intended to obtain coefficients of the signal, feature extraction and usage of features extracted for facilitating automated machine learning tasks; and generate a set of features based on selected optimal mother wavelet that facilitates a distinction among varied classes of signals, facilitates learning and results in a classifier or a regression model, predictions on the second set of signals, wherein the selection of the optimal mother wavelet facilitates a higher quality of the generated set of features.

5. The system of claim 4, wherein the set of distance values are computed by normalizing, the set of distance values, using a N-norm technique, based upon the values of energy and entropy, to obtain the one or more optimal mother wavelets.

6. The system of claim 4, wherein the one or more optimal mother wavelets are obtained by analyzing, the probable set of mother wavelets, based upon the labelled datasets, to classify the one or more signal classes.

7. One or more non-transitory machine readable information storage mediums comprising one or more instructions which when executed by one or more hardware processors causes the one or more hardware processor to perform a method for obtaining optimal mother wavelets for facilitating machine learning tasks, said method comprising:
(i) identifying, by the one or more hardware processors, a first set of signal data, based upon a plurality of signals, wherein the first set of signal data comprises labelled datasets corresponding to one or more signal classes;

(ii) computing, based upon the first set of signal data and a probable set of mother wavelets, values of energy and entropy comprising of an entropy ratio and multilevel wavelet entropy of a first set of signals corresponding to a wavelet transform by the probable set of mother wavelets and extracting a list or a table of wavelet keywords by crawling a web and publications to fetch the probable set of mother wavelets and further identifies the mother wavelets through deep neural network technique in which an input signal is passed through levels of network to obtain the probable set of mother wavelets;

(iii) computing, based upon the values of energy and entropy, a second set of signal data comprising values of centroids and standard deviations of the first set of signals corresponding to the one or more signal classes;

(iv) computing, based upon the second set of signal data, a set of distance values comprising distance between the centroids corresponding to the one or more signal classes, wherein the set of distance values are computed based upon a function corresponding to the second set of signal data;

(v) obtaining, one or more optimal mother wavelets, for performing the wavelet transform of the first set of signals, based upon the set of distance values and the values of standard deviations corresponding to the one or more signal classes, wherein one or more mother wavelets that correspond to a maximum distance value is selected as the optimal mother wavelet, wherein if multiple mother wavelets correspond to the maximum distance value, then the mother wavelet with a minimum value of the standard deviation is selected as the optimal mother wavelet, wherein the obtained one or more optimal mother wavelets enables decomposition of the second set of signals by applying a discrete wavelet transform on the second set of signals and whenever any mother wavelet from the probable set of mother wavelets matches with morphology of the first set of signals is identified, then application of the discrete wavelet transform facilitates in analysis and feature extraction from a signal among the first set of signals, thereby process of the wavelet transform is intended to obtain coefficients of the signal, feature extraction and usage of features extracted for facilitating automated machine learning tasks; and generating a set of features based on selected optimal mother wavelet that facilitates a distinction among varied classes of signals, facilitates learning and results in a classifier or a regression model, predictions on the second set of signals, wherein the selection of the optimal mother wavelet facilitates a higher quality of the generated set of features.

8. The one or more non-transitory machine readable information storage mediums of claim 7, wherein computing the set of distance values comprises normalizing, the set of distance values, using a N-norm technique, based upon the values of energy and entropy, to obtain the one or more optimal mother wavelets.

9. The one or more non-transitory machine readable information storage mediums of claim 7, wherein obtaining the one or more optimal mother wavelets comprises analyzing, the probable set of mother wavelets, based upon the labelled datasets, to classify the one or more signal classes.

* * * * *